United States Patent Office 2,809,118
Patented Oct. 8, 1957

2,809,118

PROCESS FOR COMPACTING AND THE PLASTIC STIFFENING OF NATURAL AND ARTIFICIAL SOILS

Karl Friedrich Keil, Berlin-Lankwitz, Germany

No Drawing. Application February 26, 1953,
Serial No. 339,179

1 Claim. (Cl. 106—84)

The object of the invention is a process for the compacting and plastic stiffening (consolidation) of natural and artificial soils in solid and loose condition such as loess, loam, sand, gravel, rock fines, sewage sludges as constructional material and foundations by means of solutions of water glass and any or more of the following hydratizing chemicals: sodium carbonate, ammonium carbonate, sodium bicarbonate, sodium bisulphate, ammonium phosphate and the like with addition of compacting and hydratizing substances such as ground clay, bentonite, naturally moist clay or the like, in as much as necessary.

The process according to the invention represents an essential advance and novelty in that the masses are thoroughly mixed with the chemicals and that in as much as necessary there are added the hydratizing and simultaneously compacting and elastic substances of inorganic origin. In this way, there is obtained a packing mass which stiffens elastically and plastically within a time being regulatable within narrow limits it being possible for the density of said mass to be varied. It is very elastic, insoluble, and does not impair the density as vertified by endurance tests. It is not capable of being washed out, in contrast to the natural packing substances which have not been improved.

According to the process of the present invention, the production is carried out by mixing the types of soil to be compacted and stiffened (in brief, to be improved) with one another in concrete mixers. The masses are mixed for 2 to 3 minutes and form a thixotropic mass, which stiffens in fractions of an hour with loss of thixotropy. For example, there are employed 100 kg. of sand, 25 kg. of ground clay, 15 kg. of water glass and about 1.5 kg. of soda or ammonium carbonate and the like, and also enough water to form a liquid pasty mass.

After the short thorough mixing, the packing mass can be poured out directly on embankments of dams, dykes or canals or introduced into predetermined spaces as a core packing of cofferdams or earth dams, and also dykes etc., for filling in other cavities in the foundation, leakage slots or cable ducts. Owing to the high surface tension, it displaces any accumulating water and seals off in a satisfactory and complete manner. With the application as a packing layer or as core packing, the mass can be easily shaked in order to prevent cavity formation and to ensure a uniform density. The plastic character of the mass is ensured in the same degree, in which the packing mass is protected against drying out, for example, by a layer of loam which is 10 cm. thick.

The process of the invention can be used for all packing purposes in hydraulic engineering, with earth dams, canals, dykes and the like; it can also be used as a foundation packing in foundation engineering and also for the surface packing or road surfaces and coffer dams in order to prevent the flooding and the penetration of surface water.

For this purpose, the chemicals are simultaneously sprayed and scattered over the surface to be treated and intimately and uniformly mixed by means of rakes at the same time to the required depth with the adjacent ground.

The process of the invention can also be used for packing and closing pump sumps and cavities of the deep subsoil.

Moreover, inclines which tend to slip can be protected against access of water liable to cause the slipping by lining longitudinal trenches at the upper packing edge with such packing masses.

The process represents a very important technical advance in that now it is no longer necessary in any district, for example, a sandy area, or in districts poor in loam, to carry out the expensive supply of natural packing loam or clay, but the sand or weather-worm loam is improved in situ by addition of the media according to the invention to the desired degree of density and a high-grade insoluble packing material, which cannot be washed out can easily be produced with permeability values of $10^{-8}$ cm./s., which is characterised by high resistance to slipping owing to the hydratizing and is permanently resistant.

More especially, when using these highly elastic packing masses, the expensive filter layers between the supporting and packing elements in the coffer dam can be dispensed with. Following on the supporting member is put a thin equalising layer, then the packing layer and the usual grit layer, when the packing is lying on the water side. The construction of the dam is thus substantially simplified. The costs are considerably lowered, for instead of the usual very thick packing, there is used a packing layer restricted to fractions of this usual thickness, for example, only about 2 metres thick instead of 8 metres. Finally in the case of mounting of the packing on the water side, the embankment can be given a slope of at least 1:2 as compared with the former 1:4 to 1:2.5 and thus considerable masses can be saved.

This novel process thus leads to a technically greatly simplified, less expensive and very reliable construction of coffer dams and similar earth structures with a considerable reduction of costs and saving of time. The term "plastic" as used in the claim means deformable and non-rigid.

I claim:

A process of consolidating natural and artificial soils into substantially solid plastic condition, comprising the steps of mixing with sand, ground clay, water glass and at least one substance selected from the group consisting of sodium carbonate and ammonium carbonate in a ratio of 25 kg. of ground clay, 15 kg. of water glass and 1.5 kg. of said substance per each 100 kg. of sand; further mixing the thus formed mixture with an amount of water sufficient to form a liquid, pasty mass; pouring the thus formed liquid, pasty mass into cavities which are to be filled so as to render the same watertight; and allowing said liquid, pasty mass in said cavities to harden, thereby obtaining a substantially solid plastic mass.

References Cited in the file of this patent

UNITED STATES PATENTS

| | | |
|---|---|---|
| 1,220,575 | Wedge | Mar. 27, 1917 |
| 1,321,085 | Booth | Nov. 11, 1919 |
| 1,470,674 | Amies | Oct. 16, 1923 |
| 2,437,387 | Hodgsen | Mar. 9, 1948 |